United States Patent [19]
Jarvis et al.

[11] Patent Number: 5,934,486
[45] Date of Patent: Aug. 10, 1999

[54] DISH RACK WITH EXTENDER

[75] Inventors: Charles W. Jarvis, Irvine; John W. Goodin, Coto de Caza, both of Calif.

[73] Assignee: Cambro Manufacturing Company, Huntington Beach, Calif.

[21] Appl. No.: 08/998,236

[22] Filed: Dec. 24, 1997

[51] Int. Cl.⁶ .................................................... A47F 5/00
[52] U.S. Cl. .................... 211/41.8; 220/4.03; 211/126.2; 211/126.12
[58] Field of Search .................................. 211/41.2, 41.5, 211/126.2, 126.3, 126.12, 41.3, 41.8, 194; 206/503, 509, 512; 220/4.03

[56] References Cited

U.S. PATENT DOCUMENTS

| | | |
|---|---|---|
| D. 233,180 | 10/1974 | Thurman . |
| D. 259,818 | 7/1981 | Beavis . |
| D. 260,568 | 9/1981 | Cherry . |
| D. 263,375 | 3/1982 | Thurman . |
| 3,245,548 | 4/1966 | Kesilman et al. .................. 211/41.8 X |
| 3,482,707 | 12/1969 | Weiss .................................... 211/126.2 |
| 3,672,530 | 6/1972 | Bridenstine et al. .................. 220/4.03 |
| 3,800,957 | 4/1974 | Krause . |
| 4,150,464 | 4/1979 | Tracy . |
| 4,353,470 | 10/1982 | Polhemus et al. ................. 211/126.12 |
| 4,499,997 | 2/1985 | Swingley, Jr. . |
| 4,529,092 | 7/1985 | Swingley, Jr. . |
| 4,723,679 | 2/1988 | Sinchok et al. . |
| 4,887,724 | 12/1989 | Pielechowski et al. ....... 211/126.12 X |
| 4,974,737 | 12/1990 | Miller ..................................... 220/4.03 |
| 5,114,037 | 5/1992 | Hillis et al. ............................. 220/4.03 |
| 5,191,514 | 3/1993 | Kabat et al. . |
| 5,483,899 | 1/1996 | Christie . |
| 5,582,305 | 12/1996 | Howell, Sr. et al. . |

OTHER PUBLICATIONS

Traex Rack–Master Full Size Rack System Catalog pp. (13 pages) (undated).

*Primary Examiner*—Robert W. Gibson, Jr.
*Attorney, Agent, or Firm*—George F. Bethel

[57] ABSTRACT

A dish rack having a base portion with a substantially single side walled structure and an extender for seating on the base portion having a substantially single walled structure along its sides. The extender for seating on the base portion has prongs extending from the lower region formed as a pair of tines terminating in a barb. Sockets are formed within the base portion having socket walls with a notch therein for receiving the prongs. The prongs are flexible and formed on the lower portions of the extenders and are adapted to index and interface with the sockets. The prongs with the barbed ends seat in sockets having a sloped portion for forming the notch for receiving the barbs of the prongs.

19 Claims, 5 Drawing Sheets

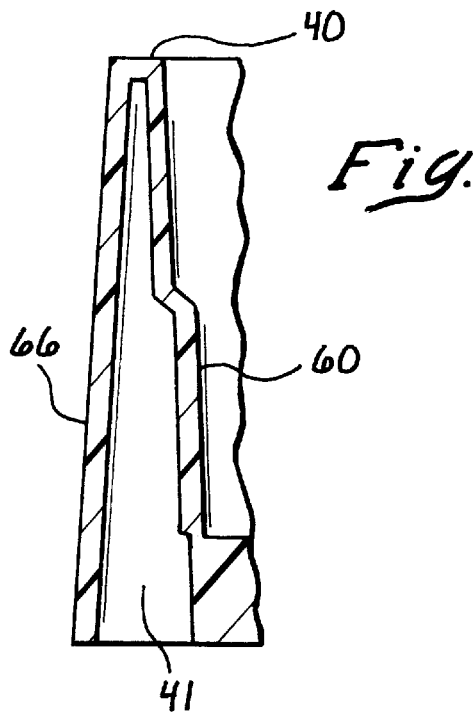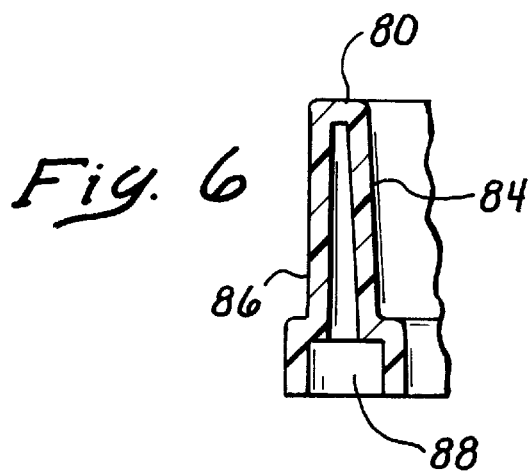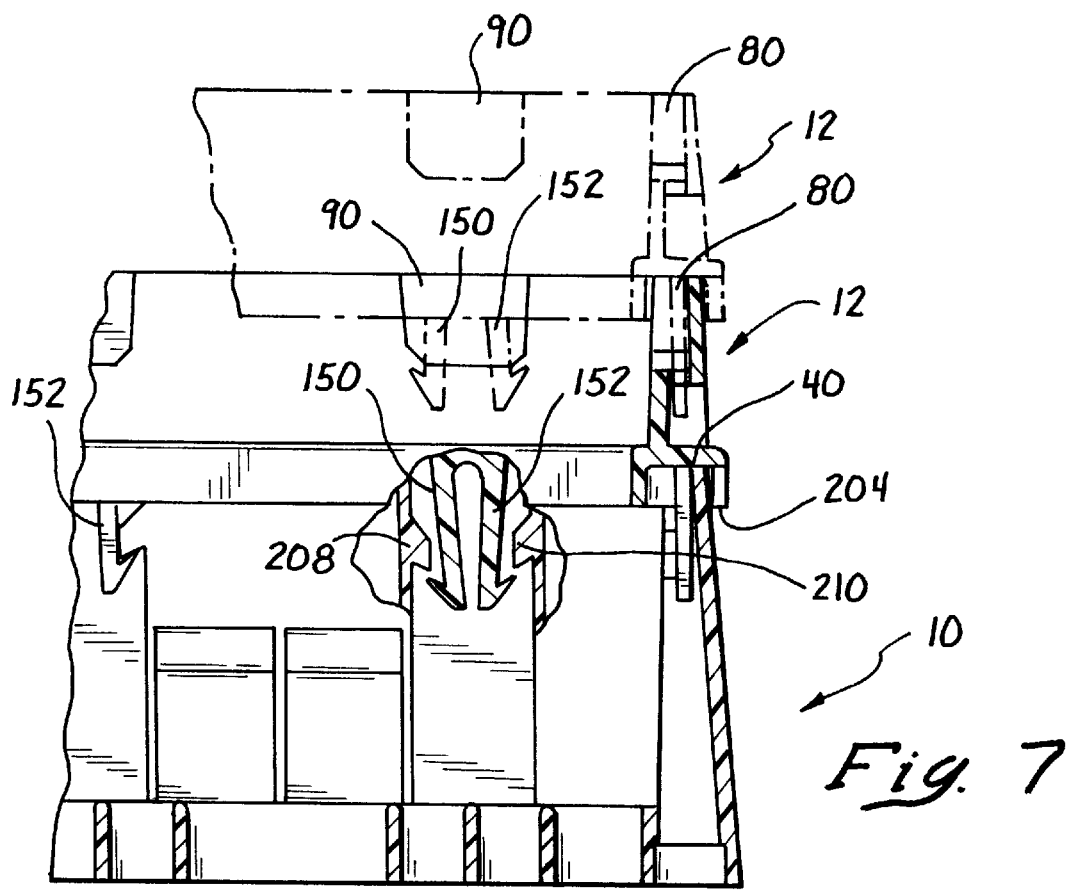

DISH RACK WITH EXTENDER

BACKGROUND OF THE INVENTION

1. Field of the Invention

The field of this invention lies within the art pertaining to washing and holding various tableware and kitchenware including dishes, silverware, tumblers, glasses and various and sundry items pertaining thereto. More specifically it pertains to the art of holding tableware and kitchenware in a rack that can be used for washing and storing. It particularly relates to a storage and racking system that can be extended in height with versatility for implementing and effecting multiple washing requirements.

2. Description of the Prior Art

Tableware and kitchenware washing and storage systems of the prior art generally relied upon racks or fixtures which could accommodate singular or multiple functions. When multiple and various types of tableware or kitchenware were utilized, various types of racks had to be configured and implemented for washing purposes.

The racks in some cases in order to provide for flexibility were manufactured so that they could nest or be extended. During the nesting or extension, it was common to utilize various means for securing them including screws and metal fixtures. When such racks were assembled, they were permanently made to nest together in an extended configuration. In this manufacturing manner they could not be separated for flexibility and later used as tableware or kitchenware racks for various alternative heights of glasses and plates.

The invention hereof is a significant step over the art by virtue of its flexibility. It enhances utilization once assembled. Also, various components can be re-assembled to provide variously sized racks, as well as the ability to be engaged modularly once assembled.

The base rack of the invention and the other elements include ergonomically designed handles for reduced glassware breaking and reduced lifting injuries. Further to this extent, the universality of the rack is such where it can stack with many dish rack configurations.

The extent of the invention's overall quality, is enhanced by not including any uses of screws, rivets or bolts as in the prior art. This eliminates rust as far as various metal fasteners are concerned, and also creates greater uniformity, strength, extending and nesting qualities.

The inventive system is such where the base racks with the extension racks are formed for use on an easy and facile basis to meet multiple configurations and demands.

The racks incorporate a single wall construction along the sides to provide clean storage and effective cleaning. The single wall configuration provides for cleanliness and strength with its ribbed elements. The corners are reinforced with a double walled structure.

All of the foregoing advantages and features of this invention will become apparent in the following specification as enunciated hereinafter.

SUMMARY OF THE INVENTION

In summation, this invention comprises a tableware and kitchenware rack that has nested and coupled extenders that are easily assembled and disassembled for providing continuous nesting configurations for variously sized tableware and kitchenware such as dishes, glasses, tumblers, cups and saucers.

More specifically, the invention incorporates a base rack having an enlarged base portion with handles. The handles are ergonomically designed to allow for lifting of the base as well as any attached extensions or extenders.

The base rack incorporates sockets or openings having sloped sidewalls with an angled undercut to receive extending barbs, tangs, couplers, tines or latch springs. Further to this extent, each wall portion of the base has an upper surface or rail for receipt on its upper edge region, a grooved channel having flanges on either side for mating and nesting in an accurately indexed manner on an underlying base rack or extender.

The mating and nesting of the base rack with the extenders is accomplished in a finely indexed manner. A channel of an extender overlies the upper surface or rail of the base rack. This is done in such a manner as to maintain the continuity of the walled configuration extending downwardly for retention thereon.

Each of the extenders has a series of forks, prongs, barbs, latch springs, or dual tangs which are in associated relationship with each other. They extend into and are received within the sloped sidewall base openings or sockets. This is accomplished by having the tangs, tines or prongs provided with a sufficiently resilient cross-section. This allows them to extend into the sloped walls of the base rack openings or sockets and underlying extending notch portions to mate therewith. This is accomplished once the tangs or prongs move into and expand into the undercut surfaces or notches of a lower and mating member which can include the base rack or an extender.

The prongs or forked portions can be displaced from their underlying engagement within the slot, sockets or walls into which they are received. This is accomplished by squeezing them together and allowing them to be withdrawn incrementally around the edge of the wall with the interfacing prongs and slots.

In order to provide for a resiliently strong wall while at the same time have a single wall construction on the sides, the base dish racks and the extenders have ribs, bosses and structure sufficient to provide rigidity. The corners are formed with a 90° arcuate double walled corner in order to enhance the strength at the corners of the walls.

The various features of this invention will become more apparent from the following specification that details the inventive aspects of the summary of this invention.

BRIEF DESCRIPTION OF THE DRAWINGS

FIG. 5 shows a sectional view of the double walled section of the base rack at the 90° corner curve along lines 5—5 of FIG. 1.

FIG. 6 shows a sectional view of the double walled portion of the 90° curve of the extender in the direction of lines 6—6 of FIG. 1.

FIG. 7 shows a displacement of the prongs, barbs or tangs inwardly for removal of the extender from the base dish rack.

DESCRIPTION OF THE PREFERRED EMBODIMENTS

Figure 1:
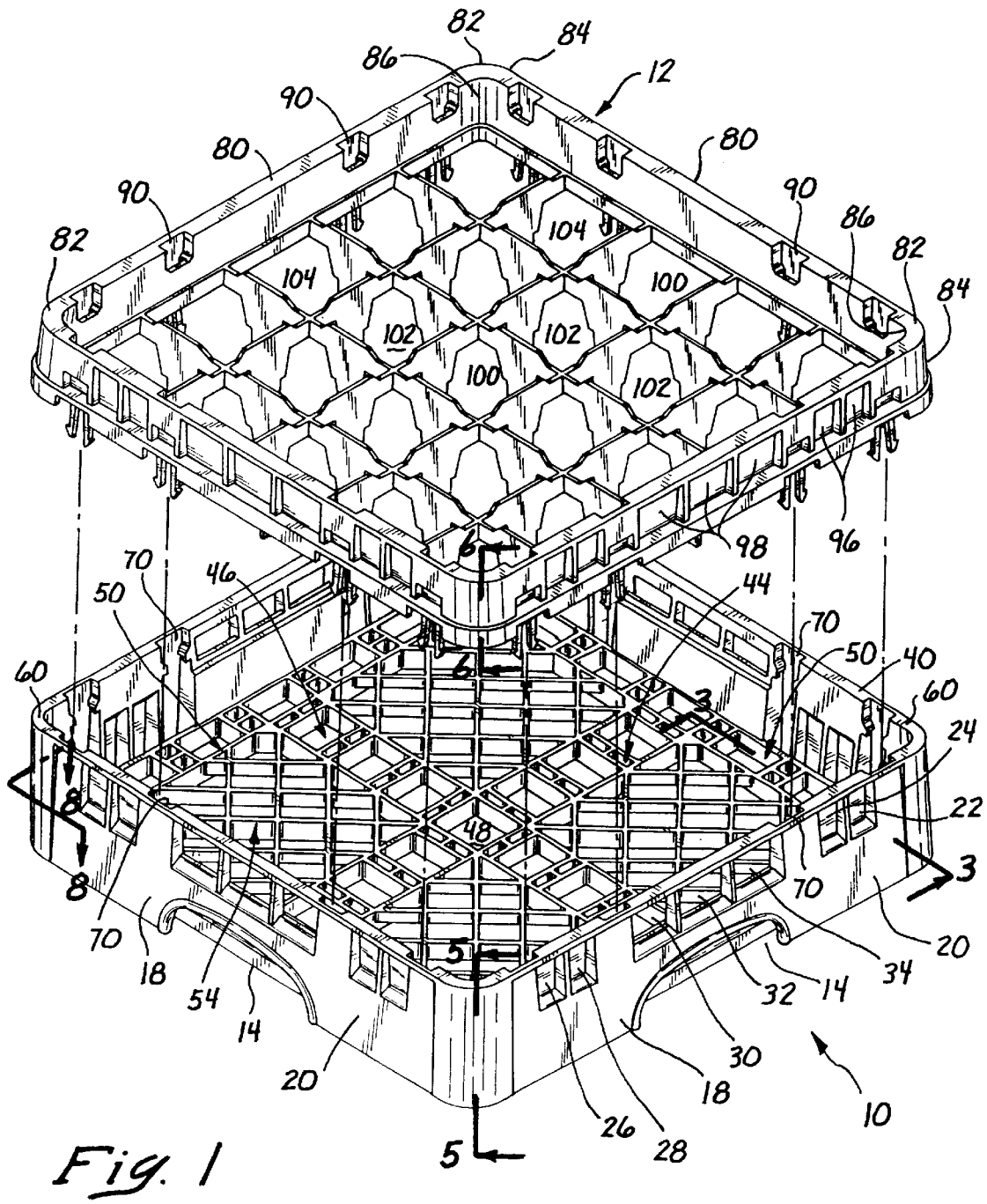
FIG. 1 shows a perspective view of the base rack portion of this invention with a rack extender superimposed thereover in an indexed relationship.

Looking more specifically at FIG. 1, it can be seen that a base portion or base dish rack member 10 has been shown underlying an extender 12. The base 10 and extender 12 nest together to form a continuous walled rack.

The base 10 and extender 12 are indexed so as to be capable of emplacement with each other. In this particular embodiment, the base dish rack can receive multiple extenders 12 of various interior forms types and size; that would have various configurations for purposes of accommodating various tableware whether they be dishes, knives, forks, tumblers, cups or other items of tableware. In this particular instance, the spaces of the extender 12 are adapted for receiving large tumblers or mugs. It should be born in mind that the extenders 12 can be nested and connected on top of each other to form one continuous side wall from the base 10.

Looking more particularly at the base 10, it can be seen that it incorporates four insets or handle portions 14 that are evenly distributed at midsection areas in all of the four walls.

The walls of the base and the other portions are of a single walled construction in the lateral intermediate areas such as intermediate areas 18 and 20 on all sides. For purposes of easy identification, the sidewall portions 18 and 20 of each of the four side walls being uniform have been identified by like numbers. These walls portions 18 and 20 incorporate bosses 22 and 24 formed in wall portion 20 and bosses 26 and 28 formed in wall portion 18. These respective bosses rigidify and secure the walls 18 and 20 so that they do not flex and collapse, and are intermediately divided by a rib.

In order to provide a through portion, a series of openings or windows 30, 32 and 34 are shown. These openings are also rigidified with rubs 99 in between each opening.

Figure 3:
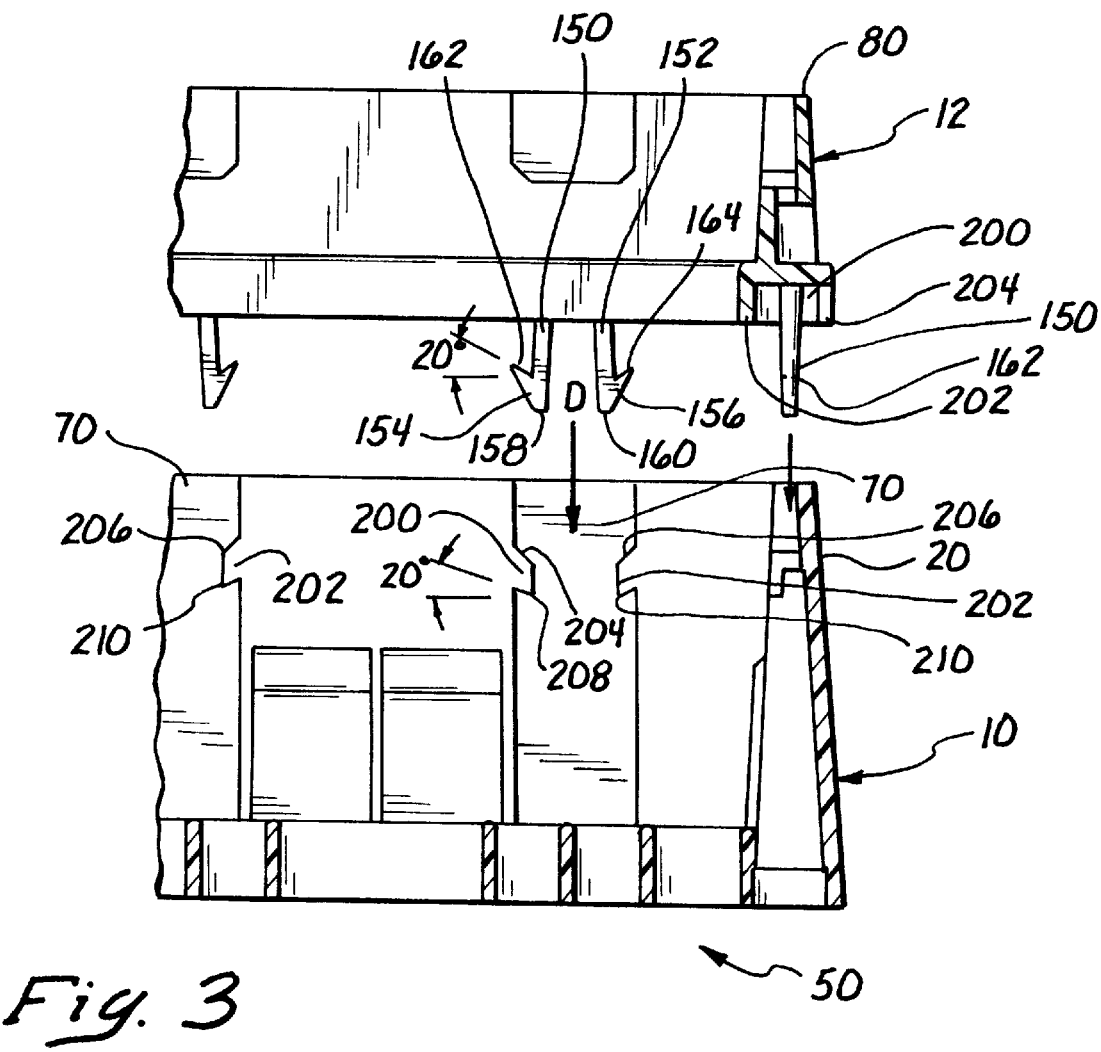
FIG. 3 shows an extender being lowered downwardly for engagement with the base rack.
Figure 4:
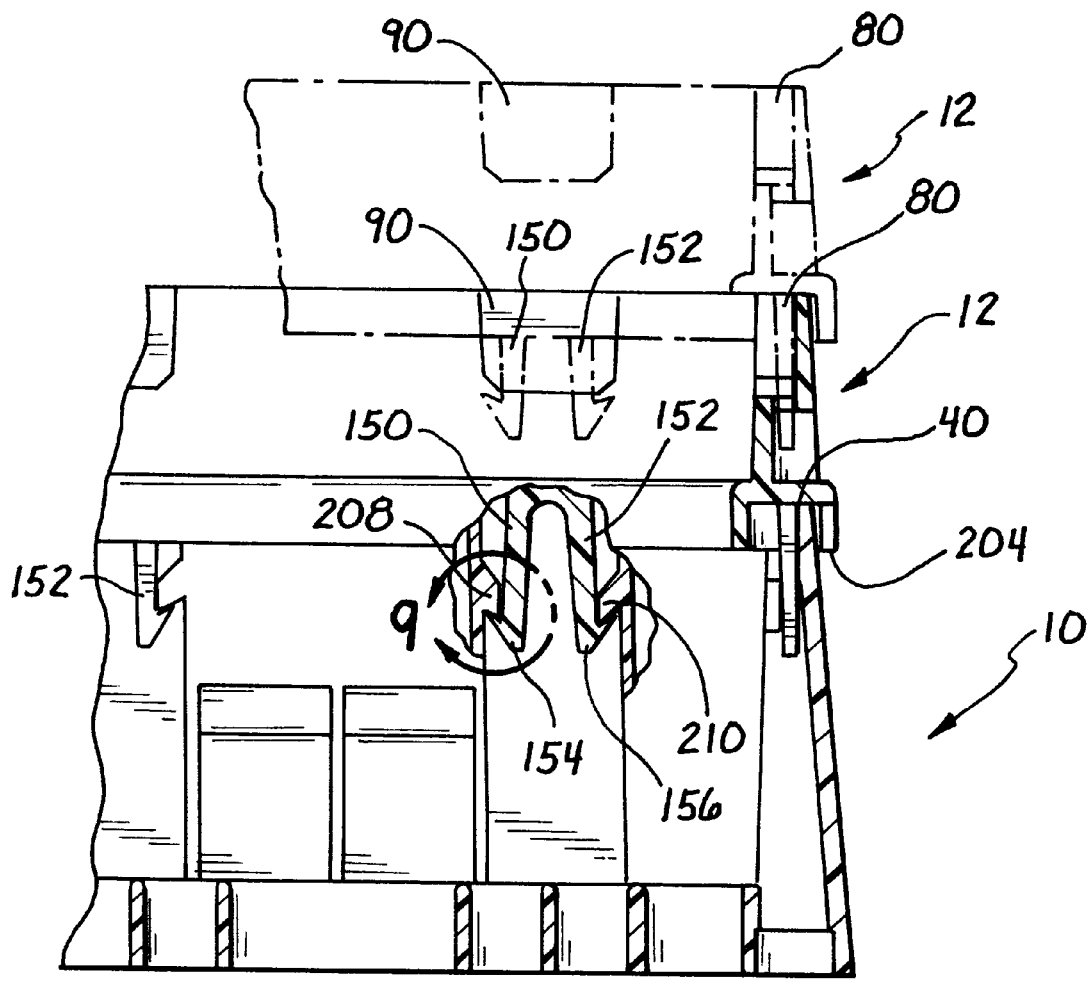
FIG. 4 shows the base with two extenders nested and superimposed thereover detailing by the fragmented sectional view the relationship of the prongs or tangs underlying the undercuts or notches in the sockets of the underlying base and extender.

A top rail or top wall portion surrounding the base portion wall namely rail 40 surrounds the base 10 top effectively to provide for an upper support surface. The lower portions of the walls 18 and 20 expand outwardly into a channel to allow for a nesting of the top wall portion 40 therein as will be seen in the sectional views. FIGS. 3, 4, and 2b show the various bases and extenders superimposed on each other for purposes of storage and securement.

In order to provide for a base rack having sufficient washing opening and at the same time strength, a major cruciform configuration comprising major and minor rectangular openings is shown. The cruciform has a first lateral section 44 and a second lateral section 46 crossing each other at a crossing 48. These respective cross portions of the cruciform namely cross portions 44 and 46 terminate at the walls. In order to provide for greater strength and access, boundary areas of rectangular webs are also provided in the form of a series of rectangular boundary webs 50. The rectangular boundary webs 50 are of a major and minor size configuration interiorly surrounding the walls 18 and 20.

In between the cruciforms 44 and 46 and the outside series of major and minor rectangular boundary webs 50, a series of diagonal cross members 54 form a series of major rectangular inserts or openings. These lie between the four quadrants of the cruciform formed by arms 44 and 46 and the outer rectangular boundary webbed wall portions 50.

Figure 8:
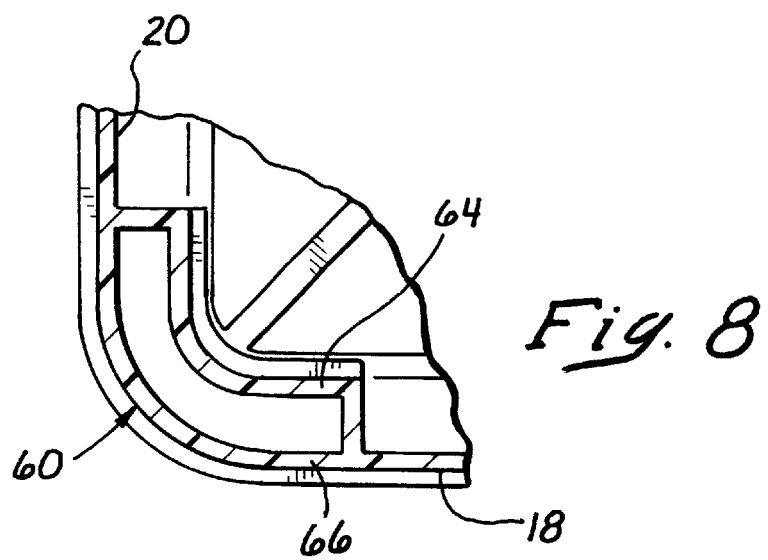
FIG. 8 shows a sectional view of the double walled configuration along lines 8—8 of FIG. 1 at the 90° curve of the base rack with the corners and the single walled side walls extending therefrom.

At each corner, a 90° curved arcuate wall 60 is shown. Each walled portion 60 at the corners is double walled and then terminates into a single wall (i.e. walls 18 and 20). The double walled portion 60 is for purposes of rigidifying the corner segments and t hen tapers or angles into the single walls 18 and 20. In this embodiment, the termination of the double walls is an angular formation terminating into the single walls 18 and 20. This can be seen in greater detail in FIG. 8.

Further as to the walled configuration, it can be seen that the sectional view of FIG. 5 shows an inner and outer walled portion respectively inner wall 64 and outer wall 66 with the upper rail or surface 40 being shown. The interior defines a channel or void 41 to receive the top rail 40 at the corners for nesting of the base 10 and extenders 12.

Depending from the top surface 40 of the base 10 are a series of openings, grooves, sockets or receptacles that receive the prongs that will be described hereinafter. These openings or sockets shown as openings 70 around the periphery have been singularly detailed for purposes of showing the indexed relationship of the openings or sockets as they are spaced around the edge with respect to the prongs.

Looking more particularly at the extenders 12 it can be seen wherein they can form a series of nested extensions, and are provided with four major wall portions of equal length. These major wall portions or rails 80 terminate at curved 90° arcuate portions 82 at each corner. These curved 90° arcuate portions 82 are double walled segments that can be seen more clearly in FIG. 6 namely as outside wall 86 and inside portion 84. As shown in FIG. 6, the respective inner and outer portions are joined at a top portion forming the rail 80 and a lower portion which is an open void or channel 88. This is analogous to the lower portion void or channel 41 which is also opened showing the open area in FIG. 5 of the curved corners of the base 10. This allows for drainage and nesting based upon the groove or channel that surrounds the respective extender 12 and the base 10 at its lower edge region.

The extender 12 also has a series of openings, slots, grooves, sockets or receptacles 90 analogous to those sockets or receptacles 70 of the base 10. These receptacles or sockets 90 receive the prongs or tines of an extender there above it in an analogous manner to that of the opening 70 in the base 10.

The walls 80 have a plurality of bosses 96 in the regions distal from the center and a number of bosses 98 in the central area. These serve to rigidify and maintain the walls 80 in a fixed and firm relationship to prevent torquing and twisting in an unwarranted manner. Here again, these bosses 96 and 98 with the vertical and lateral ribs therebetween provide for rigidity of the walls and an improved single walled configuration for the walls 80.

Interiorly of the walls 80 are a series of egg crate walls 100 that can be seen providing rectangular openings 102 between each of the walls 100. The walls 100 are in right angular relationship and intersect each other at corners 104 to provide the openings 102 that receive glasses or enlarged tumblers.

The egg crate walls 100 can be formed in any configuration to receive tableware or kitchenware of any type. This includes dishes or other items that can pass therethrough and rest on the cross members of the cruciform arms 44 and 46 and the diagonal portions 54 of the base 10. In effect, the extenders are configured to receive the specific tableware or kitchenware to be washed in their respective openings.

Figure 2A:
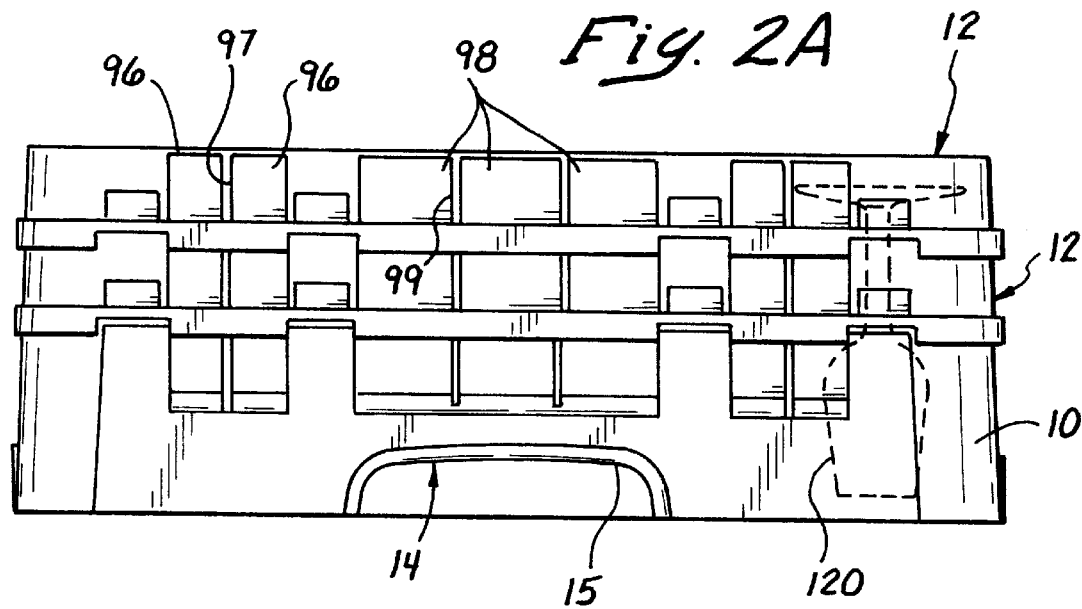
FIG. 2a shows a side elevation view of two dish rack extenders attached to the base.
Figure 2B:
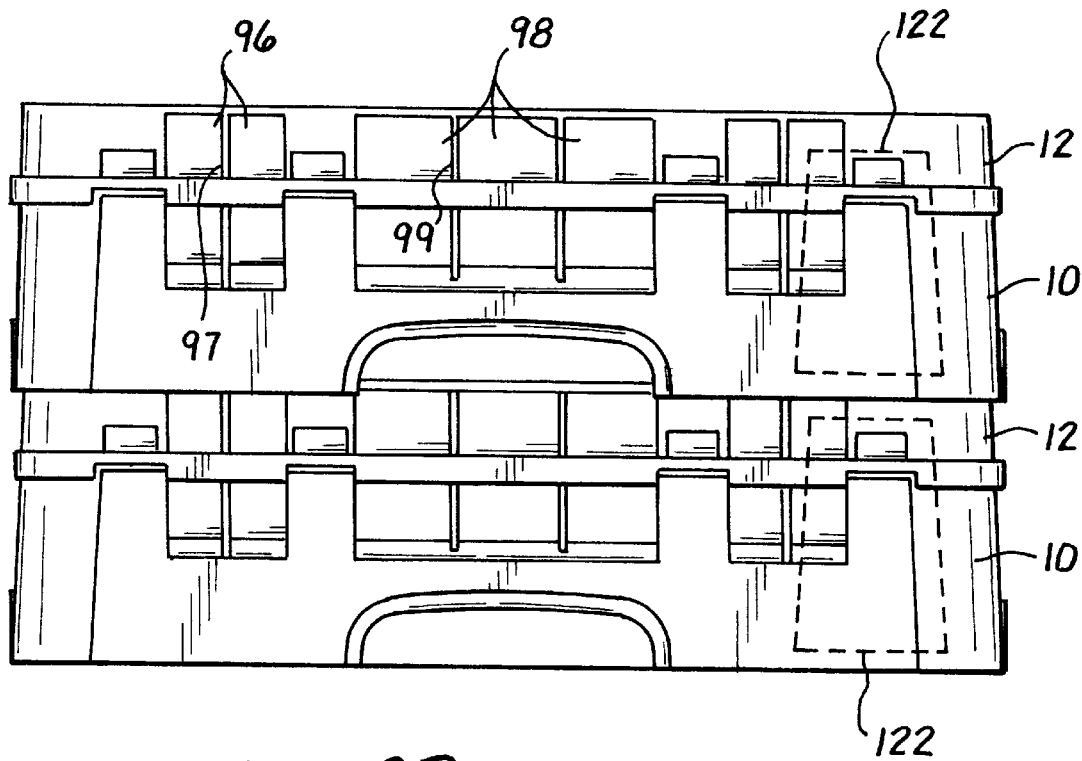
FIG. 2b shows two base dish racks each with an extender and nested on each other.

Looking more particularly at FIGS. 2a and 2b, the nesting of the extenders and the bases can be seen and are shown respectively in FIGS. 2a and 2b. In particular, a pair of extenders 12 are shown nesting in FIG. 2a with a base 10. Dotted within the openings of the extender and lying on the bottom of the diagonal portion 54 of the base 10 is a tumbler or glassware 120. The respective bosses 98 are shown with the bosses 96 of the extender and the respective ribs or walls 99 and 97 dividing the bosses 96 and 98. Also, in FIG. 2a it can be seen that the base 10 has a handle or gripping area 14 with an upper surface 15 for purposes of gripping and lifting.

Looking more particularly at FIG. 2b, it can be seen that a nesting of base members 10 on top of extenders 12 is shown. The extenders 12 here again have the respective bosses 98 that are divided by ribs or walls 99 as well as the displaced bosses 96 divided by rib 97.

The extenders 12 are connected to the bases 10 and the bases 10 are nested and overlaid on top of an extender 12. In this manner, bases 10 with extenders 12 can be nested on top of each other in order to provide for stacking, storage and maintenance of glasses or other tableware and kitchenware after washing.

Thus, the tumblers shown as tumblers 122 in the base portions and divided by the egg crate walls 100 allow for stacking in their entirety. Continuous stacks of extenders 12 and bases 10 can be stacked on top of each other. Additionally, extenders 12 can be attached to each other in order to provide for heightened openings 102 and walls 100 of the extenders 12. To this extent, the extenders 12 can have various configurations as previously stated for dishes, silverware, tumblers, cups and saucers or any other type of tableware including kitchenware for cooking purposes within the openings 102. Thus the walls 100 can be configured as larger, smaller, curved or angular, depending upon the type of kitchenware or tableware that is to be emplaced therein. Also, the walls 100 can have multiple heights depending upon the number of extenders 12 that are nested and connected on top of each other.

Looking more particularly at FIGS. 3 and 4, it can be seen wherein the extenders 12 are being placed and nested in their respective base members 10. In particular, an extender 12 having pairs of prongs, tines, or fork portions 150 and 152 that have tangs or barbs at the ends are provided. In particular, the prong 150 has a barb 154 and prong 152 has a barb 156. These barbs or tangs are pointed with points 158 and 160. At the trailing ends of the barbs, is an undercut, reverse point, or trailing end 162 and 164 having a relieved portion for underlying a mating edge as will be detailed hereinafter.

The terminal portions of the barbs 154 and 156 with their trailing ends 162 and 164 are such wherein they are offset from the horizontal or line that would be normal or at 90° to the axis of prongs 150 and 152 by 20°. In effect, they slope upwardly at 20°. It has been found that the upward slope can be effective when in the range of 5° to 45°.

The tines or prongs are flexible and are allowed to collapse toward each other so as to accommodate the sides of the openings or sockets 70 as have been described hereinbefore. The openings or sockets 70 receive the prongs with the barbs 154 and 156 against an interior ledge, shelf or sloping wall 200 and 202. The sloping walls have upper surfaces 204 and 206 SO that the ends of the barbs 154 and 156 can slide thereover. The barbs 154 and 156 then engage a lower downwardly depending narrow trailing edge surface 208 and 210 that define a notch or space into which the trailing edges 162 and 164 of the barbs 154 and 156 are seated.

As the barbs 154 and 156 are driven downwardly in the direction of arrow D, they slide over the upper sloping surfaces 204 and 206. This causes the prongs 150 and 152 to be flexed inwardly. After the trailing edges of the barbs 162 and 164 pass the trailing edges of the interior gripping walls 208 and 210, they spring outwardly against the walls of the opening or socket 70. In this manner they engage and lock against the two trailing barbed portions 208 and 210 and in the notches formed therein. This allows the extender 12 to be engaged within the base 10.

In addition thereto, it can be seen that a channel portion 200 having edge walls 202 and 204 surrounds the respective prongs or tines 150 and 152. These walls 202 and 204 serve to index the extender 12 against the base portion outer walls 18 or 20 as shown in FIG. 3. Additionally, the walls 202 and 204 and in particular wall 204 can index the upper portion of each extender along its upper wall 80. This provides for an indexed channeled and grooved relationship of the extenders and the base respectively 12 and 10. This holds true whether the extenders are matched and indexed to each other or allowed to override and index onto the top surface 40 of the base 10.

FIG. 4 shows the prongs 150 and 152 once they have been seated with their barbs 154 and 156 against the interior wall surfaces or trailing edges 208 and 210 and secured into the notices formed therein. In this manner, they are locked and secured so as to be held until further released. Additionally, it can be seen in FIG. 4 that two extenders 12 have been superimposed on each other with their respective openings or sockets 90 receiving the prongs or tines 150 and 152 therein in the underlying relationship against the trailing edges of the walls 208 and 210. Also, it can be seen that the walls 202 and 204 forming a channel that overrides the respective wall or rail 40 of the base 10 or extender wall 80 has been nested together for accommodating each one in a stacked and nested secured relationship.

Figure 9:
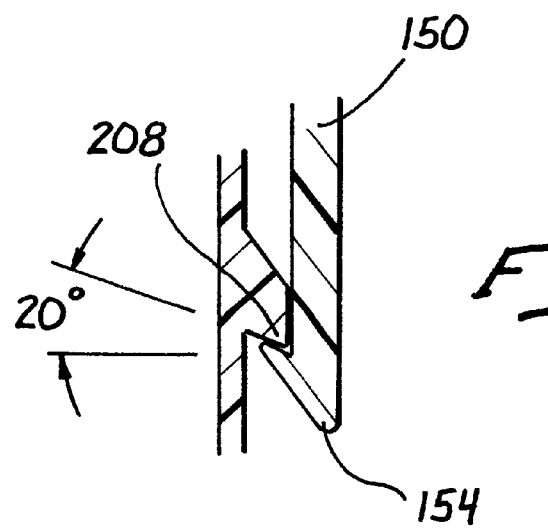
FIG. 9 shows a sectional view of the barbs and notches of this invention as encircled by circle 9 of FIG. 4 to indicate the upward slope of the barbs and notched walls.

FIGS. 3 and 9 show the trailing edges 208 and 210 with a slope matching the barbs 154 and 156. The slope as shown is upward 20° from a line normal or horizontal to the axis of the socket. However, like the barb's slope 154 and 156 it can range from 5° to 45° upwardly.

Looking more particularly at FIG. 7, it can be seen as to how the extenders 12 and base 10 are removed from each other. In particular, a like showing of FIG. 4 has been shown in FIG. 7 wherein extenders 12 are shown superimposed on a base 10. These respective extenders 12 superimposed on the base 10 have their respective prongs or tines 150 and 152 inserted into the openings or sockets 70 of the extenders and base 12. These prongs 150 and 152 for removal purposes are displaced from their underlying trailing edge portions 208 and 210 or notches of the adjacent wall latch elements of the openings or sockets 70 and 90. In order to do this, a simple tool such as a pair of pliers including needle nose pliers and other configurations as well as wedging tools, clamps, or elements that can wedge in and displace the prongs 150 and 152 can be utilized to bend them inwardly in the manner shown in FIG. 7.

The base 10 is shown with the prongs 150 and 152 of the extender 12 that is extending thereinto being displaced inwardly and allowed to slide over the undercuts, notches or edges of the trailing edges of the walls 208 and 210. In this manner, the base or extenders can be removed from each other for provision of differently sized extenders. This can go to the extent of providing differently configured openings 102 of the extenders 12 or different configurations such that they can be used with variously sized tableware or kitchenware.

The foregoing feature is particularly helpful when considering the fact that the dish racks may very well outlast the respective tableware or kitchenware of an institution, restaurant, hospital, school, etc. By interchanging the extenders, it allows for continuity of life of the base and the extenders for various washing duties of variously configured and sized kitchenware and tableware. Thus, the flexibility for holding different kitchenware and tableware in the extender allows for broad changes and characterization of the mix of tableware and kitchenware that can be washed by the system of this invention.

In order to remove the base 10 and extenders 12 respectively from each other, one or two of the pairs of prongs 150 and 152 can be displaced from their openings or sockets 70 or 90. Thereafter the adjacent or neighboring pairs of prongs can then be removed as one works around the edge of the extender or base that it is to be removed from. Thus, it is not necessary to have a simultaneous gripping of all pairs of prongs or tines 150 and 152 around a particular segment base or extenders. They can be worked incrementally as each one is displaced with respect to its neighbor or adjacent pairs of prongs 150 and 152.

It should be noted that the base portion 10 and extender 12 are integrally formed in a molding process, each as an entirely molded item. Thus the various features including the prongs and sockets of this invention are each integral and molded as a portion of their respective base 10 and extender 12.

From the foregoing it can be seen that a flexible and facile system for providing a dish rack base and extenders has been provided by this invention which should be read broadly in light of the following claims.

We claim:

1. A dish rack comprising:

a base portion with sides and corners having a substantially single walled structure along its sides;

an extender with sides and corners for seating on said base portion having a substantially single walled structure along its sides;

double walls forming said corners of said base portion and said extender; and means for connecting said base portion to said extender.

2. The dish rack as claimed in claim 1 further comprising:

said connecting means for connecting said extender to said base portion comprises pairs of prongs extending from said extender for seating within sockets of said base portion.

3. The dish rack as claimed in claim 1 further comprising:

prongs extending from the bottom of said extender for seating in sockets within the top of said base portion.

4. The dish rack as claimed in claim 1 further comprising:

a channel formed in the lower portion of said base portion and said extender wherein said channel portion of said extender is adapted for seating on the top of said base portion and said channel of said base portion is adapted for seating on the top edge of another base portion or extender.

5. The dish rack as claimed in claim 1 further comprising:

a channel on the lower portion of said extender adapted for seating on the top portion of said base portion.

6. The dish rack as claimed in claim 4 further comprising;

multiple pairs of prongs spaced around the bottom of said extender and within the channel for seating within sockets of said base portion.

7. The dish rack as claimed in claim 5 further comprising:

multiple pairs of prongs spaced around the bottom of said extender and within the channel thereof for indexed seating within sockets formed in said base portion.

8. The dish rack as claimed in claim 7 further comprising:

bosses within the single walled structure of said base portion and said extender formed in the sides thereof.

9. A dish rack comprising:

a base portion;

at least one extender for connection to said base portion having prongs extending from the lower region of said extender formed as a pair of tines terminating in a barb on at least one of said tines; and, sockets within said base portion having inwardly extending socket walls with a notch therein for receiving the prongs.

10. The dish rack as claimed in claim 9 further comprising:

a multiplicity of spaced prongs around the lower portion of said extender adapted to fit into indexed sockets of said base portion.

11. The dish rack as claimed in claim 9 wherein:

said prongs are flexible for inward displacement.

12. The dish rack as claimed in claim 11 wherein:

said barbs have an angular surface for engaging the sides of said socket walls.

13. The dish rack as claimed in claim 12 further comprising:

said sockets have a sloping wall portion with an undercut in the form of a notch to receive said barbs.

14. The dish rack as claimed in claim 12 wherein:

said barbs are formed upwardly at an angle of 5° to 45° from a line normal to the axis of said prongs.

15. The dish rack as claimed in claim 13 further comprising:

sockets having notches formed upwardly at 5° to 45° from a line normal to the axis of said socket.

16. A connector for connecting a base portion, with an upper surface, of a dish rack to an extender with a lower surface comprising:

a plurality of sockets in the upper surface of the base portion extending thereinto;

pairs of flexible prongs on the lower portions of said extender adapted to index and interface with said sockets;

each of said pairs of prongs having a barbed end; and, each of said sockets having a sloped portion of its interior wall forming an angular notch for receiving the barbs of said prongs.

17. The dish rack as claimed in claim 16 wherein:

said extender has a channel on a lower surface forming a region in which said prongs are mounted.

18. The dish rack as claimed in claim 16 wherein:

said base portion and extender have side portions and corners, and are formed of a single wall substantially along the side portions.

19. The dish rack as claimed in claim 18 wherein:

said base portion and said extender has a double walled curved portion at the corners thereof forming a substantially 90° curved double wall construction which terminates in said single walls.

* * * * *